United States Patent Office 3,565,830
Patented Feb. 23, 1971

3,565,830
COATED FILM OF CATALYTICALLY ACTIVE OXIDE ON A REFRACTORY SUPPORT
Carl D. Keith, Summit, Paula M. Kenah, East Orange, and Daniel L. Bair, Roselle Park, N.J., assignors to Engelhard Minerals & Chemicals Corporation, a corporation of Delaware
No Drawing. Continuation-in-part of application Ser. No. 527,511, Feb. 15, 1966, which is a continuation-in-part of application Ser. No. 256,819, Feb. 7, 1963, and also is a continuation-in-part of application Ser. No. 527,494, Feb. 15, 1966, now Patent No. 3,331,787, which is a continuation-in-part of application Ser. No. 256,820, Feb. 7, 1963. This application July 14, 1967, Ser. No. 653,322
Int. Cl. B01j 11/08, 11/16
U.S. Cl. 252—466
15 Claims

ABSTRACT OF THE DISCLOSURE

A catalyst composition is made having a platinum group metal and a film of catalytically active metal oxide supported on an inert, substantially catalytically inactive refractory support which exhibits a porosity of at least 0.03 cc./gm., say 0.1 to 0.3 cc./gm., and a substantial water pore volume. There are unobstructed openings or channels going through the support through which pass the chemical materials converted by the catalyst, e.g. automobile exhaust gases and oxygen, during its use. Calcined alumina is a suitable film of catalytically active metal oxide and alpha-alumina and zircon-mullite can be used as supports. The support is mainly crystalline and can have a macropore distribution such that over 95% of the pore volume is in pores having a diameter of over 2,000 A. and over 5% of the pore volume is in pores having a diameter of over 20,000 A. One way of making the catalyst is to deposit the film on the support and then impregnate the film with the platinum group metal. The platinum group metal can be fixed on the support by treatment with, for instance, hydrogen sulfide. As a final preparation step the catalyst can be calcined.

---

This application is a continuation-in-part of application Ser. No. 527,511, filed Feb. 15, 1966, which in turn is a continuation-in-part of application Ser. No. 256,819, filed Feb. 7, 1963; and this application is also a continuation-in-part of application Ser. No. 527,494, filed Feb. 15, 1966, now Pat. 3,331,787, which in turn is a continuation-in-part of application Ser. No. 256,820, filed Feb. 7, 1963. Applications Ser. Nos. 256,819; 256,820, and 527,511 are abandoned.

This invention relates to the manufacture of catalysts and more particularly to catalysts composed of a relatively porous refractory support provided with a thin film or coating of a catalytically-active refractory metal oxide, which film is impregnated with a catalytically-active metal. In a more specific embodiment the present invention is directed to the preparation of catalysts having a catalytic structure that makes them particularly suited for use as oxidation catalysts in the purification of automobile exhaust gases and industrial waste gases.

The metals and metal oxides of Group VIII of the periodic table have long been acknowledged as hydrocarbon oxidation catalysts. They have, for example, been employed per se in pellet or granular form but more commonly have been deposited as the catalytically active component on a support or carrier. While many of these oxidation catalysts perform successfully under relatively mild conditions, there has been current demand for an oxidation catalyst which is active enough chemically and rugged enough physically to withstand extremely severe operating conditions over a long period of time. For example, the use of oxidation catalysts for the purification of exhaust gases from automobiles has been suggested in the past but has not been widely adopted due to the fact that the catalysts available have either been of insufficient activity, exhibited short life and/or were incapable of sustaining the physical stresses and strains involved. This invention concerns the preparation of a catalyst of high activity, long life and extreme durability.

In accordance with the present invention, a film or coating of a refractory metal oxide is provided in a chemically, i.e., catalytically, active form on the external surface of a catalytically-inert, relatively porous refractory material and the film is impregnated with a water-soluble compound of a platinum group metal. The impregnated film, which may be continuous or discontinuous but is usually relatively uniform over the surface, is in the preferred embodiment, treated with, for instance, hydrogen sulfide to fix the active metal impregnant in a relatively water-insoluble form, i.e., the sulfide when hydrogen sulfide is used.

The inert refractory support or carrier of the present invention, onto which an active refractory metal oxide film is deposited, is a solid unitary or monolithic skeletal body having a plurality of unobstructed openings or channels therethrough in a direction of desired fluid flow and is preferably of a size that permits occupancy by one or more of the bodies of at least a major portion of the cross-sectional area of the reaction zone to be employed. Advantageously, the unitary body is shaped to fit the reaction zone into which it is to be disposed.

The support or carrier is constructed of a substantially chemically-inert, substantially catalytically-inactive, rigid, solid material capable of maintaining its shape and strength at high temperatures, for instance up to 1100° C. or more. The material often has a bulk density of about 0.45 to 1.05 grams per cubic centimeter, preferably about 0.5 to 0.9 gram per cubic centimeter, is unglazed, and can contain a major proportion of crystalline material. Preferably the material is essentially crystalline in form and advantageously at least about 90% crystalline material, and is marked by the absence of any significant amount of glassy or amorphous matrices, for instance, of the type found in porcelain materials. Further, the support has considerable accessible porosity as distinguished from the substantially non-porous porcelain utilized for electrical appliances, for instance, spark plug manufacture, characterized by having relatively little accesible porosity, typically about 0.011 cc./gram. The accessible pore volume of the support of this invention, not including the volume of the fluid flow channel, is at least 0.03 cubic centimeter per gram of support, preferably in the range from 0.1 to 0.3 cc./g. Such measurements of accessible pore volume were made by pressurizing the material with Hg from atmosphereic pressure up to about 1200 pounds, which is equivalent to a measurment of pores between about 1400 A. and 100,000 A. in diameter. The Hg penetrates the pores without wetting the material. The support exhibits a substantial water pore volume, i.e. when immersed in water and wetted and then when essentially all of the free water is removed from the channels the support retains a considerable amount of absorbed water in its pores. The retained water generally constitutes at least about 10% based on the dry weight of the support before immersion, and often this amount does not exceed about 60% or somewhat more. Preferably, the amount of retained water or water pore volume is about 15 to 50% of the dry support. Many of the supports exhibit water pore volumes in the range of about 20 to 40 or 45%.

The walls of the channels of the unitary skeletal support of the invention can contain macropores in communication with the channels to provide increased accessible catalyst surface and, preferably, an absence of small pores for high temperature stability and strength. Whereas the superficial surface area of such structures may be of the order of 0.001 to 0.01 m.$^2$/g. including the channels, the total surface area is typically many times greater, so that much of the catalytic reaction will take place in the large pores. The skeletal structure can have a macropore distribution such that at least 95% of the pore volume is in pores of a size, i.e., a diameter, of over 2,000 A. and at least 5% of the pore volume is in pores having a size of over 20,000 A. In a preferred embodiment at least 20% of the pore volume is in pores of a size over 20,000 A. The support can have other pore distributions as long as the total pore volume indicates a structure having at least 0.03 cc./gm., preferably at least 0.1 cc./gm., in pore volume. Thus, at least 95% of the pore volume can be in macropores of over 200 A. in size. Also some portion of the pore volume, for instance, at least abut 5%, can be in pores of at least 2,000 A. in size. Generally, the total surface area, that is including the pores, of the support or carrier of the present invention as distinguished from the apparent surface area, is at least about 0.08 square meter per gram, preferably about 0.2 to 2 square meters per gram. The geometric superficial or apparent surface area of the carrier including the walls of the openings should be as large as is consistent with an acceptable back pressure in the fluid flow system. Ordinarily, in the treatment of auto exhaust gases, the volume of catalyst and the superficial surface area are adjusted to a back pressure of less than about 10 pounds per square inch, and preferably less than about 5 pounds per square inch, at maximum acceleration. The superficial area will often be about 0.5 to 6, preferably 1 to 2.5, square meters per liter of support.

Thus, the openings through the body can be of any shape and size consistent with the desired superficial surface and should be large enough to permit free passage of the fluids to be reacted and to prevent plugging by particulate matter that may be present in the fluids as, for instance, lead compounds. In one embodiment, the channels or openings are generally parallel and extend through the support from one to an opposite side, such openings being usually separated from one another by preferably thin walls defining the openings. In another embodiment, a network of channels permeates the body. The channels are unobstructed or substantially unobstructed to fluid flow. For most efficient operation, the openings are distributed across essentially the entire face or cross-section of the support subject to initial contact with the fluid to be reacted. The preferred supports or carriers are zircon-mullite characterized by having good thermal shock resistance because of its low coefficient of thermal expansion, and alpha-alumina although other similar chemically-inert refractory crystalline ceramic materials can also be employed. Examples of other refractory materials suitable as a support or carrier are, for instance, sillimanite, magnesium silicates, zircon, petalite, spodumene, cordierite, alumino-silicates, mullite, etc. Any of these usually essentially crystalline materials may be formed into refractory bodies as may be desired in a mix with a minor amount of a binder. Suitable binders include clays for instance ball clays, calcium carbonate, magnesium aluminum silicates (V-gums) and Na$_2$SiO$_3$ either used alone or in a balanced combination.

The catalytically-active metal oxide is deposited on the external surface of the unitary skeletal support as a continuous thin deposit or as discontinuous thin deposit usually at a thickness of about 0.0001 to 0.005 inch, preferably 0.0004 to 0.001 inch, and when mixed with platinum group metal, makes up the film or coating on the support of the invention. The catalytically-active refractory metal oxide is characterized by a porous structure which possesses a large internal pore volume and total surface area. Its presence in the catalyst of the invention is important since impregnation of the carrier directly with the platinum group metal provides an unsatisfactory catalyst. Generally, the total surface area of the active refractory metal oxide film will be at least about 25 square meters/gram, preferably at least about 100 square meters/gram. Such oxides can be prepared by at least partially, preferably substantially completely, dehydrating and thus activating the hydrate form of the oxide by calcination usually at temperatures of about 150 to 700° C. or 800° C. or somewhat more. The preferred active metal oxide films contain members of the gamma or activated alumina family which can be prepared, for instance, by precipitating a hydrous alumina gel and thereafter drying and calcining to expel hydrated water and provide the active gamma-alumina. A particularly preferred active refractory metal oxide is obtained by drying and calcining at temperatures of about 300° to 700° or 800° C. a mixture of precursor hydrous alumina phases predominating in crystalline trihydrate, that is, containing in excess of about 50% of the total alumina hydrate composition, preferably about 65 to 95% of one or more of the trihydrate forms gibbsite, bayerite and nordstrandite (previously known as randomite) by X-ray diffraction. The substantial balance of the hydrate, i.e., at least 5% preferably about 5 to 35%, may be amorphous hydrous or monohydrate (boehmite) alumina. Calcination of the precursor hydrous alumina is preferably controlled so that the gamma-alumina obtained contains monohydrate alumina in an amount substantially equivalent to that originally present in the mixture of the high trihydrate precursor hydrous alumina phases. Other suitable active metal oxides include for example, active or calcined beryllia, zirconia, magnesia, silica, etc., and combinations of metal oxides such as boria-alumina, silica-alumina, etc. Preferably the film is composed predominantly of oxides of one or more metals of Groups II, III and IV having atomic numbers not exceeding 40. The concentration of the active refractory metal oxide film is usually about 15 to 150 grams per liter of the unitary support, preferably about 30 to 75 grams per liter.

Providing the support with a coating or layer of the calcined or active refractory metal oxide of the present invention can be acomplished in several ways. One method comprises dipping the support into a solution of the salt of the chemically active refractory metal and calcining to decompose the salt of the oxide form. This method generally necessitates several similar dippings, however, before a satisfactory film or layer is obtained. A more preferred method comprises dipping the support into an aqueous suspension, dispersion or slurry of the refractory oxide itself, drying and calcining. In this method, while suspensions or dispersions having a solids content in the range of about 10 or 30 to 70% by weight can be used to deposit a suitable amount of an active refractory metal oxide on the support in a single application, it is preferred that they contain about 15 to 50% by weight of solids. Dispersions containing over 50% by weight of solids in many instances are too viscous for the coating or film producing process. In order to prepare a catalyst having 10% activated alumina on a zircon-mullite structure, for example, about 20–40% solids in suspension may be used. A particularly preferred method involves forming an aqueous dispersion or slurry as just described and subjecting the mixture to a wet grinding or milling operation whereby the refractory metal oxide is reduced to a finely divided form and a thixotropic slip is obtained, having the desired consistency, with a solids content as noted above. The support is then dipped into the slip, dried and calcined. In general, calcining temperatures within the range of about 150 to 700 or 800° C. are employed. The calcination is favorably conducted in air, for example, flowing dried air, or may be carried out in contact with other gases such as oxygen, nitrogen, hydrogen, flue gas, etc., or under vacuum conditions. The refractory oxide is deposited on the surfaces of the skeletal structure including the channel surfaces and superficial macropores in communication with the channel surfaces as thin deposits in a weight ratio of about 1% to 50% and preferably about 5% to 30% relative to the weight of the support.

In a prefered embodiment of the present invention the support is advantageously wetted prior to applying the coating of active refractory metal oxide. This operation comprises immersing the support in water for a time sufficient to fill the pores of the support with water. The support is then drained and can be blown with air or other gas to remove excess water. In a preferred embodiment a zircon-mullite skeletal structure is immersed in an aqueous suspension containing the desired weight concentration of active refractory oxide. The skeletal structure because of its porosity, has been found to absorb the suspension readily. The catalyst structure is then dried and calcined at a temperature of about 400° C.–800° C. and preferably 450° C.–550° C. A ⅛ cubic foot zircon-mullite block may absorb roughly 0.25 to 1 liter of the suspension.

The catalyst in accordance with the method of the present invention, has the film of active refractory metal oxide impregnated with a platinum group metal (e.g. platinum, palladium, ruthenium, iridium, rhodium or combinations thereof). The impregnation with the platinum group metal can be accomplished by immersing the support with its adherent film into a solution of a water-soluble inorganic salt of the platinum group metal or metals and agitating the mixture to insure uniform distribution of the metal. If desired, the wetting operation described above can also be employed after the active metal oxide film has been deposited and prior to impregnation with the catalytic metal. In the final catalyst the platinum group metal may be in free or combined state but if in the elemental form it is preferred that the metal be in sufficiently divided state that it is not detectable by X-ray diffraction techniques, i.e., as crystallites of less than 50 A. size. After impregnation with the platinum group metal, the catalyst may advantageously be contacted with hydrogen sulfide to fix the platinum metal in the active refractory oxide film as a sulfide and give a more active and suitable catalyst with good dispersion of the platinum group metal in a form preventing migration of the metal during drying and calcination. Alternatively, an aqueous solution of a platinum group metal compound may be reacted with hydrogen sulfide to form a sol, and this sol applied to the film of active refractory metal oxide. Following such treatments the completed catalyst can be calcined within the range of 150 to 700 or 800° C. and under gas conditions as previously noted.

The final catalyst must have the active refractory metal oxide film in the activated or calcined state. Activation of the refractory metal oxide film may be carried out prior to placing the film on the support or subsequent thereto and even after the platinum group metal impregnation step. Usually, the film-forming material is calcined before placement on the carrier and also after such placement and before deposition of the platinum group metal component. The essential calcination of the refractory metal oxide film may be accomplished during the period of initial use in converting exhaust gases but this is not a preferred operation since it could give rise to discharge of contaminated gases during this stage of operation. The catalyst containing the platinum group metal may be reduced as by contact with molecular hydrogen at elevated temperatures before, during or after calcination.

Aside from the above-described method of preparing the catalyst of the present invention, the catalyst is capable of manufacture by other methods as, for example, the method described in our application Ser. No. 256,820 filed Feb. 7, 1963, and its continuation-in-part application Ser. No. 527,494, filed Feb. 15, 1966, both herein incorporated by reference.

In accordance with the method of the latter applications an aqueous dispersion containing a chemically, i.e., catalytically, active refractory metal oxide and a water-soluble platinum group metal compound is first formed. The refractory metal oxide may be combined with the platinum group metal compound, while the former is in either its hydrous or dehydrated (activated or calcined) form. The aqueous dispersion is then applied to the external surfaces of the chemically and catalytically inert refractory support and the thus-coated support is calcined to provide the support with a film of said active refractory metal oxide containing catalytically effective amounts of the platinum group metal. The film may be continuous or discontinuous but is usually relatively uniform over the surface of the support. The slurry of refractory metal oxide and platinum group metal can be treated, either before or after deposition on the support with, for instance, hydrogen sulfide, to fix the active platinum group metal in a relatively water-insoluble form, e.g. a sulfide.

As mentioned, the platinum group metal compound can be added to the refractory oxide while the oxide is in its hydrous form or alternatively after substantial dehydration of the refractory oxide even to its activated or calcined form. Thus, the refractory oxide deposited on the support of the invention may be a catalytically active refractory oxide or a refractory oxide capable of being placed in a catalytically active form by calcination. In the former case, the aqueous dispersion applied to the support is prepared by dispersing finely-divided activated refractory metal oxide in an aqueous medium and adding thereto the platinum group metal compound. The resulting aqueous dispersion is then applied to the support as a thin coating and the coated support dried and calcined. In a second embodiment, the aqueous dispersion is prepared by first forming an aqueous slurry of the refractory metal oxide in its hydrous form, adding the platinum group metal compound to the slurry and then drying and calcining the resulting mixture to substantially dehydrate the oxide to provide an active refractory metal oxide containing the platinum group metal. The thus-formed activated refractory metal oxide-platinum group metal compound mixture is then dispersed in a finely divided form with water to produce the aqueous dispersion applied to the support of the present invention. Alternatively, the slurry applied to the support may contain the platinum group metal compound and one or more of the hydrous or hydrate forms of the refractory metal oxide and then the coated support can be calcined to activate the catalyst.

It is preferred and advantageous that the platinum group metal be fixed or well dispersed in the active refractory metal oxide as, for instance, by hydrogen sulfide treatment to provide the metal in the active refractory oxide as the insoluble sulfide. This fixing of the platinum group metal curtails its migration during drying and calcination. Although the fixing of the metal can be conducted after the aqueous dispersion of the refractory metal oxide and platinum group metal is applied to the refractory support it is preferred that the fixing occur prior to application of the aqueous dispersion. In many instances application of the platinum group metal compound and active refractory oxide to the support without the platinum group metal being fixed to the oxide results in some of the platinum group metal penetrating the pores of the support and being covered by the refractory oxide thereby producing a catalyst less active for various oxidation processes such as automobile exhaust oxidations.

Any method known to the art whereby the platinum group metal can be fixed to the active refractory metal oxide, that is prevented from migrating, can be employed but hydrogen sulfide treatment is preferred. Hydrogen sulfide treatment can be conducted in any suitable manner, as for instance, by maintaining the platinum group metal-active refractory metal oxide combination in an atmosphere of hydrogen sulfide for a time sufficient to provide the platinum group metal on the active metal oxide as the insoluble sulfide. Usually at least about 10 minutes of purging with hydrogen sulfide at ambient temperature is quite sufficient. The hydrogen sulfide treatment can be conducted prior to applying the platinum group metal-active refractory metal oxide combination to the refractory support, but the treatment may be carried out after such application. It is also possible to prepare a sol from a soluble platinum compound and hydrogen sulfide and apply this to the hydrous or refractory metal oxide.

The water content of the aqueous dispersion of the platinum group metal and refractory metal oxide to be applied to the support should be controlled so that the solids content of the dispersion or suspension is in the range of about 10 or 30 to 70%, preferably 15 or 30 to 50% by weight. This solids content gives a dispersion having a consistency conductive for application and provides on application to the support a suitable amount of platinum group metal-containing refractory metal oxide. A solids content of 15 to 50% by weight is preferred since there are instances where solids content of 50% provides dispersions too viscous for convenient application. In order to prepare a catalyst having 10% activated alumina on a zircon-mullite structure, for example, about 20–40% solids in the suspension may be used.

Reduction of the active refractory metal oxide combined with platinum group metal to a finely divided, dispersible, form can be performed by any means known to the art. A preferred method involves subjecting the calcined oxide or mixture particles to a grinding or milling operation with water so as to obtain a thixotropic slip having the desired consistency, with a solids content as noted above. The dispersion can be applied to the support and calcined by the methods described above.

Regardless of how the catalyst is made, the amount of platinum group metal provided the catalytically active metal oxide film can vary depending on the particular metal selected, the amount of activated metal oxide film present on the support and the pore volume of the film and support. In all instances, however, the amount of platinum group metal compound added will be that sufficient to provide a small but catalytically effective amount of the metal in the final catalyst for the purpose for which the catalyst is intended. For example, in automobile exhaust oxidation and other similar oxidation processes the amount of impregnating platinum group metal compound selected can be that which provides at least about 1.4 grams, often up to about 7 grams, preferably about 1.8 to 4.8 grams, of the metal per liter of unitary body support. Usually this amount constitutes about 0.01 to 10 percent, preferably about 0.2 to 1 percent platinum group metal (based on total supported catalyst). Platinum and palladium are particularly preferred platinum metals. Palladium is especially good for the oxidative purification of exhaust from automobiles employing non-leaded gasolines. The catalyst may contain other metallic or nonmetallic catalytic promoters in addition to the platinum group metal.

Particularly preferred supports for the catalyst of the present invention having special applicability to the catalytic oxidation of, for instance, automobile exhaust gases are unitary refractory or ceramic structures characterized by a plurality of relatively thin-walled cellular channels passing from one surface to the opposite surface and providing a large amount of superficial surface area. The channels can be one or more of a variety of cross-sectional shapes and sizes, each space being defined by ceramic walls and usually such channels are separated from one another by a wall of refractory or ceramic material. The channels can be in the shape, for example, of triangles, rectangles, squares, sinusoids, circles or other circular shapes, etc., so that cross-sections of the support represent a repeating pattern that can be described as a corrugated, lattice or honeycomb structure. Cross-sections with sharp, acute angled corners are not preferred as they can collect solids such as lead compounds from the gases and become plugged and/or catalytically inactive. The walls of the cellular channels are generally of the minimum thickness necessary to provide a strong unitary body. This wall thickness will often fall in the range of about 2 to 25 mils. With this wall thickness the structures contain from about 3 to 18 openings or more per linear inch, preferably about 4 or 5 to 15 openings per linear inch. For automobile exhaust oxidation, however, openings of 20 or more are usually avoided since they have been found too small to prevent plugging thereof by particulate matter in the exhaust. Expressed as openings per square inch, the number of holes ranges between about 30 and 2000, with 60 to 600 preferred. Thus the cross-sectional area of the support generally has a major portion made up of the holes or channel entrances, with this portion preferably being about 60 to 90% of the square area. The height and width of the structures, especially for treatment of automobile exhaust, can in general each be at least about 1" and not exceed about 10". Usually maximum height can be about 3". The length of the structure may often vary from about 6" to 34".

A corrugated ceramic support of this type commercially available has the following properties:

Material:
    Alpha-alumina
Form:
    Cylindrical.
    20 corrugations/inch.
    Wall thickness—3 mils.
Thermal conductivity (perpendicular to channel axis) cal./cm.$^2$/cm./sec./deg. C. _____ .0005
Compressive strength (parallel to channel axis) p.s.i. _____ 5000
Bulk surface area—ft.$^2$/ft.$^3$ _____ 2000
Bulk density—
    Gms./cm.$^3$ _____ .54
    Lbs./ft.$^3$ _____ 35
Cross-sectional opening (percent) _____ 80

The corrugated ceramic structures can be prepared from any of the chemically inert refractory materials previously mentioned although zircon-mullite and alpha-alumina are preferred. Any convenient method known to the art can be employed in the preparation of the structures as, for instance, the method described in British Pat. 882,484. Deposition of the active metal oxide film and the impregnation of the film is accomplished as previously described.

The external surface of the unitary body itself can, of course, be shaped as previously mentioned, to fit the reaction zone provided in the exhaust or other system into which it is to be eventually disposed as a catalyst and catalyst is placed lengthwise as to its cellular channels so that the exhaust gases flow through the multiple channels during their passage through the reaction zone. For example, the catalyst can be placed in an automobile muffler. Alternatively, the catalyst can be fitted within the exhaust pipe of the automobile, usually preceding the muffler. Advantageously, molecular oxygen from an outside source can be provided to assist in the oxidation of exhaust gases. For example, air can be injected, preferably in an amount of about 3 to 50% air based on the exhaust gas volume. High percentages of air are usually employed at idle and lower amounts can be used under acceleration and cruising conditions. Also, if desired, the air can be preheated as by heat exchange contact with the engine or its exhaust system.

The exhaust line can be provided with one or more of the unitary catalyst structures. Where more than one of the catalyst structures is used, the structures are in a fixed and predetermined relationship to each other and to the gas flow; for example, the structures may be in parallel with respect to gas flow to insure a small pressure differential, or in series for more intensive treatment. In this latter situation, catalyst structures, differing in their type of catalytic activity may be employed. In general, the amount of catalyst to be employed may vary with the size of the automotive engine, as measured in cubic inches of engine piston displacement. The amount of catalyst used can be affected by various factors of engine operation such as gasoline consumption, load on the engine, etc., but in general the amount of catalyst may be sufficient to provide about 15 to 200 square inches of superficial surface area per cubic inch of engine piston displacement; however, for passenger automobiles of the size most widely used in the United States of America, about 20 to 80, preferably about 30 to 50, square inches of catalyst superficial surface area per cubic inch of engine piston displacement should be provided. The catalyst of this invention offers a distinct advantage over pelleted catalyst systems which, according to U.S. Pat. No. 3,024,593, need about 115 to 250 square inches of catalyst surface per cubic inch of engine displacement, generally exceeding 165 in.$^2$/in.$^3$, in American passenger cars.

By contact with the catalyst structure such products of incomplete combustion as nocuous hydrocarbons and carbon monoxide are thereby removed or eliminated from the exhaust gases, and nocuous nitrogen oxides may be removed. Apparently, the hydrocarbons are removed by being catalytically oxidized to innocuous carbon dioxide and water, and the carbon monoxide is removed by being catalytically oxidized to innocuous carbon dioxide. The extent of nitrogen oxides removal depends in part on the fuel-oxygen ratio reaching the catalyst. Reaction temperatures are usually maintained at about 150 to 800° C. by use of suitable insulation for the reaction zone and catalyst. The thus-treated exhaust gases free or substantially free of nocuous constituents are then discharged safely into the atmosphere.

In general the desired space velocity for any continuous catalyst process varies with the nature of the process and it is of important economic advantage to operate at as high a space velocity as produces the desired result. Thus when increase of space velocity is possible with maintenance of satisfactory operation, the required amount of catalyst for the process may be decreased.

The unitary ceramic catalyst of the present invention is superior to the prior art particulate catalysts for high space velocity reactions in that, for all or nearly all particular applications, a higher space velocity may be used. Space velocity for fast gas phase reactions as high as 1,500,000 VHSV (volume of gas per volume of catalyst per hour) are operable with this catalyst. For the auto exhaust purification and other applications space velocities with unitary ceramic catalysts may range from about 3,000 hr.$^{-1}$, e.g., at idle, to about 250,000 hr.$^{-1}$, e.g., at acceleration or cruising. Preferred space velocities for such acceleration or cruising are in the range of 30,000 hr.$^{-1}$ to 120,000 hr.$^{-1}$.

When particulate catalysts are employed for high space velocity reactions, for example, auto exhaust purification, it is necessary to use large particles or very thin catalyst beds of smaller particles to prevent excessive back pressure. Auto engine operation is unfavorably affected if back pressure is high. The problem of holding pellets in place with such as screens increases as smaller pellets are used and fine screens to hold the pellets together with coarser backing screens for strength may become necessary. Such small particles may move and abrade in the beds with high space velocity gas streams.

For reactions where the rate of reaction is very high, the activity of a catalyst of a given composition is approximately proportional to catalyst superficial surface area. To give examples, superficial surface area for a unitary ceramic block with 7 to 8 corrugations per inch is about 1.98 m.$^2$/l., for ⅛″ x ⅛″ cylinder alumina pellets about 1.11 m.$^2$/l. and for ¼″ alumina spheres about 0.48 m.$^2$/l. Such ceramic blocks have considerably less back pressure than ⅛″ pellets and no more back pressure than ¼″ spheres. This means that, under equal back pressure conditions, the unitary ceramic catalyst has at least four times the activity of the ¼″ spheres for purification of auto exhaust.

The following examples are included to further illustrate the present invention.

EXAMPLE I

Hydrated alumina analyzing 2% amorphous hydrous alumina, 18% boehmite, 44% bayerite, 28% nordstrandite and 8% gibbsite was drum dried and calcined at 340° C. for 6 hours to yield a composition of 86% gamma-alumina, 14% boehmite and no trihydrates. Two pounds of such drum dried alumina were added to a pellet mill with 910 ml. of deionized water and 20 ml. of concentrated HCl. The mixture was milled for approximately 18 hours at about 80 to 112 revolutions per minute. 1794 grams of thixotropic slip was recovered from the mill and 350 ml. of deionized water was added thereto. Analysis of the slip showed 34.4% solids at 1100° C. X-ray diffraction analysis on the slip dried at 110° C. showed the composition to be about 75% gamma-alumina, 25% boehmite and no trihydrates.

An alpha-alumina corrugated-type block as defined above and approximately 6 inches by 4 inches by 3 inches passage length and having seven corrugations per linear inch throughout the face of the 6 inch length side was found to weigh 890 grams. The block was made from essentially crystalline alpha-alumina having typically a surface area (total) of 0.6 m.$^2$/g., a porosity of 0.20 cc./g. and a macropore distribution such that 5% of the pore volume is in pores of over 20,000 A. and less than 2% of the pore volume is in pores of less than 2,000 A. The block was submerged in deionized water for one hour, a sufficient time to fill the pores, drained and then blown through using a high pressure air gun for one-half to one minute. The blown block was then weighed to determine the "water pore volume" and was found to weigh 1072 grams. The corrugated block was then immersed for about one minute in the alumina slip previously prepared, with agitation of the block and alumina slip so that the slip tended to line the entire surface of the block and its through corrugations. After shaking and gentle blowing to remove excess slip and insure free passages, the block was weighed and found to be 1173 grams, a gain of about 101 grams over the water-soaked weight.

The corrugated block lined with alumina slip was then dried in a forced-air oven at 110° C. for 64 hours, the block being deposited in the oven so that the air currents tended to blow through the passages. The block was then weighed while still warm and it was found that approximately 50 grams of alumina was added to the block. The block was then placed in a furnace and heated slowly for about 2 hours to reach 500° C. It was maintained at 500° C. for about 1 hour and then cooled by slowly and uniformly circulating air through the passages. The initial stage of the cooling was done with air circulation while the block was still in the forced-air oven. When cooled to room temperature, the block was weighed and found to have approximately 50 grams of activated alumina from the slip.

The thus-prepared block was then immersed in an aqueous solution of $H_2PtCl_6$ containing 14.5 grams of chloroplatinic acid with 40% Pt and 1625 grams of deionized water. The block remained immersed in the $H_2PtCl_6$ solution for about 40 minutes, the solution being agitated periodically to encourage uniform distribution of Pt throughout the block. The block was removed from the solution and air blown to remove excess solution, such excess solution being blown off into the residual solution remaining in the immersion tank. The residual solution was weighed and assayed for Pt. The assay showed that 3.19 grams of Pt were recovered from the residual solution, i.e. 3.19 grams of the total of 5.8 grams of Pt in the original solution were not deposited on the block. Assuming the platinum not in the residual solution was deposited on the block, about 2.6 grams of platinum were deposited on the block.

The block plus alumina slip plus platinum were placed in a plastic bag which was then purged with $H_2S$. After maintaining such block in an $H_2S$ atmosphere for about 15 minutes, it was removed from the bag and washed thoroughly with water. Such block was left in the tank with flowing water for about 16 hours and then dried for 2½ hours at 110° C. in a forced-air oven, the block being positioned so that the air currents tended to flow through the passages. The dried block was then placed in a cold furnace for calcination. The temperature in the furnace was increased slowly to reach 500° C. in about 1 hour and it was maintained at 500° C. for two hours. The catalyst block was then cooled slowly using a cold air circulation through the passages of the block, initially while the block was in the furnace, and after it was removed from the furnace.

EXAMPLE II

Activated alumina was deposited as in Example I on a porous zircon-mullite block, approximately 6 inches by 4 inches and having passages of 3 inch length arranged in 7 corrugations per linear inch. The block was made from essentially crystalline zircon-mullite having the following typical characteristics. A surface area of 0.45–0.65 m.$^2$/g., a porosity of 0.25–0.30 cc./g., and a macropore distribution such that 79–87% of the total pore volume is in pores of greater than 20,000 A. and less than 2% of the pore volume is in pores of less than 2,000 A. A typical zircon-mullite support exhibits a water pore volume of about 42% as determined by a modified ASTM test (C20–46[1961]). Thus one or more samples was heated at 110° C. for at least 2 hours to dry and the sample weighed. The sample was suspended in boiling water for 2 hours and then the sample in the water was cooled to ambient temperature and weighed suspended in this manner. After blotting the sample with wet cotton cloth to remove free water but not that absorbed in the pores, the weight of the sample was taken. The amount of absorbed water was then calculated.

The alumina was deposited on the block in two steps using essentially the same procedure employed in Example I above for the alpha-alumina corrugated block. Approximately 37 grams of activated alumina were deposited in the first application and approximately 75 grams in the second application. Platinum was then added to the alumina lined zircon-mullite block as follows:

The block was soaked in deionized water and picked up 225 g. of such water. The moistened block was immersed in 1600 ml. of an aqueous solution of chloroplatinic acid (containing 15.5 g. of Pt) for 5 minutes. It was then drained, blown through, weighed, and placed in a plastic bag for treatment with $H_2S$. The block was then treated with $H_2S$ for 1½ hours, and dried at 110° C. Following a procedure described above, after slowly heating the block to 500° C. it was calcined for 1 hour at 500° C. and then permitted to cool slowly. Analysis showed that approximately 6 g. of platinum was deposited on the zircon-mullite block.

EXAMPLE III

On an alpha-alumina structural cylinder made from the alpha-alumina of Example I but of approximately 1 inch diameter and 2 inches length with parallel passageways along the 2″ length was deposited a film of 0.9 g. activated alumina. The cylinder with its film of activated alumina was immersed in 60 ml. of a Pd chloride solution containing approximately 0.932 g. Pd for 2 minutes. About 5.9 g. of solution remained in the cylinder which was calculated to contain about 0.084 g. of Pd. The Pd- containing cylinder was then treated with $H_2S$ for about ¼ hour and washed thoroughly in flowing water. The cylinder was then dried in a forced-air oven at 110° C. for 1 hour, heated to 600° C. and calcined for 6½ hours at 600° C. The cylinder was subsequently subsequently subjected to various heat treatments to induce accelerated aging of the catalyst. Thus, the cylinder was heated at 600° C. in air for 3 hours. At a later date it was heated in air at 800° C. for 20 hours and at still a later date it was heated in $H_2$ at 800° C. for 20 hours. The catalysts tested after the various accelerated aging treatments were still active for the oxidation of CO and hydrocarbons.

EXAMPLE IV

A catalytic auto exhaust purifier mounting was constructed as described in C.D. Keith and T. Schreuders application Ser. No. 256,856, filed Feb. 7, 1963, using catalyst blocks prepared according to the procedure of Example I except that the alumina slip was added in two applications, each being subjected to drying and calcination. The catalyst block in the mounting was approximately 6″ x 6″ x 3″ passage length, weighing 1292 g. and having approximately 74 g. of activated alumina and 3.7 g. of Pt deposited thereon.

The catalytic mounting was then inserted in a sectional device of an auto exhaust line as disclosed in the aforementioned application. A sound muffling section was installed as part of the sectional device. The catalytic mounting was removable and replaceable in the sectional device. The downstream side of the block was supported with a stainless steel screen to prevent catalyst loss in case of breakdown.

The sectional catalyst device containing the catalyst mounting and a muffler mounting was installed in a 6 cylinder 1962 Corvair. The engine displacement was 145 cubic inches. Both manifolds were connected to a common line to which the device was attached. The device was located approximately 6″ from one manifold and approximately 4 feet from the other manifold as a result of crossover to the common line.

Additional air was introduced into the exhaust system by means of an air compressor. A model 0440 Gast compressor was installed in the engine compartment and driven by a 13 volt GE ⅙ horsepower motor (17 amp). The compressor was set to deliver 3.2 c.f.m. at idle and the range of delivery varied because of backpressure, from 2.8 to 3.2 c.f.m.

The catalyst purifier was evaluated using a test procedure which simulated driving conditions. Evaluation was based on the percent of CO and hydrocarbon removed from the exhaust. The CO, $CO_2$ and hydrocarbon content of the raw exhaust gas was determined at various operating conditions. A similar analysis was made of the car exhaust stream downstream of the catalyst block. A trap was used to condense $H_2O$ out of the exhaust gas before such gas entered the infrared analyzers.

Four infrared analyzers (Beckman Nondispersive Model 15A) were used. The CO analyzer measured up to 10% CO, and $CO_2$ analyzer up to 20% $CO_2$, and 2 analyzers were used for hydrocarbons (H/C). (The hydrocarbon detectors were calibrated using n-hexane as the standard.) The high range analyzer for hydrocarbons measured up to 1% and the low range instrument up to 0.1% H/C (1000 p.p.m.) for the catalytic exhaust and up to .2% H/C (2000 p.p.m.) for raw gas. The analyzers were calibrated with known gas mixtures.

The testing procedure was essentially the same as that prescribed by the Motor Vehicle Pollution Control Board (MVPCB) of the State of California for testing motor vehicle exhaust emissions. The test consisted of a "seven-mode" warm-up cycle and an "eleven-mode" hot cycle. Each cycle consisted of a number of sequences (or modes) of idling, acceleration and deceleration under controlled conditions. A chassis dynamometer was used to effect operating conditions. The operation for each cycle was as follows:

SEVEN-MODE WARM-UP CYCLE

| Mode | Acceleration, m.p.h./sec. | Time in mode, seconds | Cumulative time, seconds | Weighting factor |
|---|---|---|---|---|
| Sequence No.: | | | | |
| 1............ Idle | ............ | ¹20 | 20 | .042 |
| 2............ 0-25 | 2.2 | 11.5⎱14 | 31.5 | .244 |
| 3............ 25-30 | 2.2 | 2.5⎰ | 34 | (²) |
| 4............ 30 | ............ | 15 | 49 | .118 |
| 5............ 30-15 | -1.4 | 11 | 60 | .062 |
| 6............ 15 | ............ | 15 | 75 | .050 |
| 7............ 15-30 | 1.2 | 12.5⎱29 | 87.5 | .455 |
| 8............ 30-50 | 1.2 | 16.5⎰ | 104 | (²) |
| 9............ 50-20 | -1.2 | 25 | 129 | .029 |
| 10........... 20-0 | -2.5 | 8 | 137 | (²) |

¹ First run time was about 40 seconds at 1,100 r.p.m. idle.
² Data not read.

ELEVEN-MODE HOT CYCLE

| Mode | Acceleration, m.p.h./sec. | Time in mode, seconds | Cumulative time, seconds | Weighting factor |
|---|---|---|---|---|
| Sequence No.: | | | | |
| 1............ Idle | ............ | 20 | 20 | .042 |
| 2............ 0-25 | 2.2 | 11.5⎱14 | ............ | .185 |
| 3............ 25-30 | 2.2 | 2.5⎰ | 34 | (¹) |
| 4............ 30 | ............ | 20 | 54 | .061 |
| 5............ 30-45 | -.14 | 11 | 65 | .033 |
| 6............ 15 | ............ | 20 | 85 | (¹) |
| 7............ 15-30 | 1.2 | 12.5⎱21 | ............ | .455 |
| 8............ 20-40 | 1.2 | 8.5⎰ | 106 | (¹) |
| 9............ 40 | ............ | 20 | 126 | .042 |
| 10........... 40-50 | 1.2 | 8 | 134 | (¹) |
| 11........... 50 | ............ | 20 | 154 | .015 |
| 12........... 50-20 | -1.2 | 25 | 179 | .029 |
| 13........... 20 | ............ | 20 | 199 | .050 |
| 14........... 20-30 | 1.2 | 8 | 207 | (¹) |
| 15........... 30 | ............ | 20 | 227 | (¹) |
| 16........... 30-0 | -2.5 | 12 | 239 | .029 |
| 17........... Idle | ............ | 20 | 259 | (¹) |
| 18........... 0-60 | 3.0 | 20 | 279 | .059 |
| 19........... | Decelerate to zero, end of test | | | |

¹ Data not read.

The dynamometer was adjusted for the Corvair to simulate road conditions at 50 m.p.h. The hydrocarbon fuel feed was commercial premium gasoline containing tetraalkyl lead.

After standardizing the analyzers, the composition of the untreated gas exhaust (no air being added) was determined for six warm-up and one hot cycles. Then the exhaust composition downstream of the catalyst block was determined for the same sequences. The instruments were then rechecked after each test. From test results of the first 4 warm-up cycles and the hot cycle, concentrations of CO, $CO_2$ and hydrocarbons were determined. The results of the test are shown in Table I.

In Table I the concentrations of CO and hydrocarbons in the untreated exhaust stream and the concentrations in the exhaust downstream of the catalyst blocks are given for the indicated sequences. The value for the warmup cycles are averages of four test runs. Correction factors entered into the concentration calculations in order to compensate for dilution resulting from the addition of air necessary to burn the combustible exhaust gases. The correction factor for each idle mode and acceleration mode is $$\frac{15}{\text{meas. percent concs. } CO + CO_2}$$

In calculating the correction value at each sequence (or mode), the measured concentration is multiplied by the correction factor. For deceleration, it is necessary to compensate for the larger percentage of hydrocarbons which do not burn. The deceleration factor which is multiplied by the measured values is $$\frac{15}{\text{percent CO} + \text{percent } CO_2 + 6 \text{ percent H/C})}$$

TABLE I.—CORVAIR AUTO EXHAUST TEST—DATA FROM SCOTT—MVPCB TEST

| | Percent CO | | | | | H/C-p.p.m. | | | |
|---|---|---|---|---|---|---|---|---|---|
| | | | | Percent removal | | | | Percent removal | |
| M.p.h. | U.S. | D.S. virgin catalyst | D.S. 12,000 miles | Virgin catalyst | 12,000 U.S. miles | D.S. virgin catalyst | D.S. 12,000 miles | Virgin catalyst | 12,000 miles |
| Idle | 5.34 | 2.11 | 1.92 | 60 | 64, 983 | 308 | 656 | 69 | 33 |
| 0-25 | 2.57 | 1.36 | 1.62 | 47 | 37, 750 | 199 | 495 | 73 | 34 |
| 30 | 2.74 | 1.25 | 1.54 | 54 | 44, 470 | 165 | 347 | 65 | 26 |
| 30-15 | 6.27 | 1.42 | 2.36 | 77 | 62, 881 | 818 | 790 | 7 | 10 |
| 15 | 4.03 | 0.51 | 1.13 | 87 | 72, 502 | 126 | 357 | 75 | 29 |
| 15-30 | 3.35 | 0.43 | 2.22 | 87 | 34, 473 | 110 | 360 | 77 | 24 |
| 50-20 | 5.08 | 0.46 | 0.71 | 91 | 86, 3,207 | 875 | 1,967 | 73 | 39 |
| Idle | 4.97 | 0.29 | 0.46 | 94 | 91, 506 | 22 | 116 | 96 | 77 |
| 0-25 | 2.96 | 0.44 | 0.88 | 85 | 70, 468 | 55 | 215 | 88 | 54 |
| 30 | 2.16 | 0.22 | 0.44 | 90 | 80, 323 | 11 | 121 | 97 | 63 |
| 30-15 | 4.91 | 0.23 | 0.36 | 95 | 93, 324 | 12 | 125 | 96 | 61 |
| 15-30 | 1.94 | 0.43 | 0.74 | 78 | 62, 367 | 38 | 148 | 90 | 60 |
| 40 | 2.13 | 0.21 | 0.42 | 90 | 80, 261 | 16 | 167 | 94 | 36 |
| 50 | 1.30 | 0.30 | 0.42 | 77 | 68, 210 | 20 | 135 | 90 | 36 |
| 50-20 | 5.32 | 0.23 | 0.35 | 96 | 93, 680 | 23 | 271 | 97 | 60 |
| 20 | 3.96 | 0.24 | 0.36 | 94 | 91, 377 | 12 | 96 | 97 | 75 |
| 30-0 | 4.26 | 0.24 | 0.37 | 94 | 91, 346 | 12 | 104 | 97 | 70 |
| 0-60 | 4.78 | 0.29 | 3.08 | 31 | 36, 294 | 124 | 199 | 58 | 32 |

NOTE:
M.p.h.=miles per hour.
U.S.=upstream.
D.S.=downstream.

From the data it can be seen that even after 12,000 miles the catalyst was found to be satisfactorily removing the CO and hydrocarbon from the automobile exhaust.

The California MVPCB test is reported to be designed to determine the hydrocarbon and CO concentrations in the exhaust gas for an average 20-minute trip in a metropolitan area—from a cold start. A formula was devised by such Board with various weighting factors for each mode within a cycle and for the average warm-up cycle and hot cycle. Based on this formula the following values were determined:

Untreated exhaust:                       Percent removal
    Hydrocarbons as n-hexane, p.p.m.=512
    Carbon monoxide, percent=3.07
Exhaust from catalyst device—virgin catalyst:
    Hydrocarbons as n-hexane, p.p.m.=117 _____ 77
    Carbon monoxide, percent=0.71 _____ 77
Exhaust from catalyst device—after 12,000 miles:
    Hydrocarbons as n-hexane=303 _____ 41
    Carbon monoxide percent=1.31 _____ 57

EXAMPLE V

On the alumina cylinder similar to that described in Example III was deposited a film of 1.0 g. activated alumina. The cylinder was then moistened with 4.3 ml. aqueous solution containing 1.582 g. $Na_2PdCl_4$ (approximately 0.575 g. Pd). The cylinder was placed in 100 ml. hot 1% $Na_2CO_3$ solution to which 1 ml. 1% $H_2O_2$ had just been added. The cylinder remainded in such solution for about 10 minutes. The cylinder was then placed in a hot solution of 4% HCOONa for ¼ hour and then washed repeatedly and finally dried at 110° C.

EXAMPLE VI

On an alumina cylinder similar to that described in Example III was deposited 2.6 g. of activated alumina. To this cylinder was then added 5 ml. of a solution containing 0.309 g. $Pd(NO_3)_2$ (approximately 0.126 g. Pd), 1 ml. conc. $HNO_3$ and $H_2O$. A medicine dropper was used to distribute the Pd solution throughout the cylinder. After adding the Pd solution, the cylinder was heated to about 200° C. in a forced-air oven for ¼ hour and then maintained at 500° C. for ½ hour. About 0.13 g. of Pd was deposited on the cylinder.

EXAMPLE VII

On an alumina cylinder similar to that described in Example III was deposited about 2.6 g. activated alumina. The cylinder was moistened with 5.5 ml. of $NaHCO_3$ solution (containing 0.219 g. $NaHCO_3$), using a medicine dropper and then dried at 110° C. in a forced-air oven for a about 1¾ hours. The cylinder was immersed in a 50 ml. hot aqueous solution containing 1.582 g. $Na_2PdCl_4$ (approximately 0.575 g. Pd). The solution was surged back and forth through the cylinder repeatedly for about 10 minutes. The cylinder was then placed in 100 ml. of a hot solution of 4% HCOONa for about 1 hr. Following this, the cylinder was washed repeatedly—by heating the cylinder in $H_2O$, draining it and then rinsing it with cold $H_2O$ and then it was dried at 110° C. overnight. About 0.25 Pd was deposited on the cylinder.

EXAMPLE VIII

Various methods were used to deposit catalytic Pt on the essentially rigid refractory oxide structures having parallel passageways. The salts were reduced thermally or using $H_2$ or a decomposable organic compound such as sugar. In this example some additional techniques are given for the addition of Pt to a rigid structure of this invention. The illustrations are given with alpha alumina cylinders of approximately 1″ diameter and 2″ length having about 0.9 g. of activated alumina deposited thereon.

(A) Preparation using $H_2PtCl_6$ and organic decomposable compound

To 60 ml. of aqueous $H_2PtCl_6$ solution (containing 1.4% Pt) 2.1 g. of cane sugar was added. A cylinder having activated alumina deposited thereon was immersed in such solution and determined to have absorbed 5.9 g. of solution. The cylinder was dried for about 15 minutes with a warm current of air blowing through the passageways. The cylinder was then calcined at 500° C. for 1 hour, after which it was washed thoroughly with deionized $H_2O$ and then dried at 110° C.

(B) Preparation using $K_2PtCl_4$

A cylinder having activated alumina deposited thereon was immersed in 52 ml. of aqueous solution containing 1.86 g. $K_2PtCl_4$ and 0.794 g. $NaHCO_3$. About 5.5 ml. of solution was absorbed by the cylinder which was then heated for about 30 minutes in a steam pressure cooker at 15 p.s.i. and about 121° C. After being washed thoroughly, the catalyst was dried and then calcined at 500° C. for 1 hour.

(C) Preparation using $H_2PtCl_6$—reducing calcination with $H_2$

A cylinder having activated alumina deposited thereon was immersed in 60 ml. of aqueous $H_2PtCl_6$ (containing 1.4% Pt) for a few minutes and then treated with $H_2S$ for ¼ hour. After being washed and dried, the cylinder was heated in a $H_2$ atmosphere for about 1 hour to reach 500° C. and then maintained at 500° C. for an hour.

EXAMPLE IX

Preparation of catalyst cylinder with a Pd catalyst

Hydrated alumina analyzing 0% hydrous amorphous alumina, 25% boehmite, and 78% trihydrates was drum dried and calcined at 350° C. to yield a composition containing 90% gamma alumina, 10% boehmite and no trihydrates.

To 200 ml. deionized $H_2O$ charged to a Waring Blendor, 140 g. of drum dried alumina was added slowly—the blender being run at low speed. The mixture was then blended at high speed for 15 minutes. A total of 4 batches of slip were prepared in this manner and then combined to make 975 ml. of alumina slip.

An alpha alumina cylinder, 1″ diameter x 2″ length having 7½ corrugations per inch, was immersed in said slip and shaken to remove excess slip. The cylinder was dried at 110° C. in a forced-air oven for about 18 hours and then heated for 2 hours to reach 475° C. and maintained at 475° C. for 1 hour. The resultant cylinder plus carrier had about 2.6 g. alumina deposited thereon.

The thus-prepared cylinder was moistened with 5.5 ml. of aqueous $Na_2PdCl_4$ (containing 0.126 g. Pd), using a medicine dropper. After standing ½ hour at room temperature in a covered dish, the moistened cylinder was placed in a forced-air oven at 60° C. for 15 minutes. The hot cylinder was placed in a 100 ml. solution of HCOONa (containing 4 g. of HCOONa) for about 1 hour. The reducing solution was not permitted to cool to room temperature. The cylinder was heated in deionized $H_2O$, drained and rinsed. This procedure was repeated several times to insure thorough washing of the catalyst cylinder. After such washing was completed, the cylinder was dried at 110° C. in a forced-air oven for about 18 hours. About 0.12 g. of Pd were deposited on the cylinder.

EXAMPLE X

The catalyst of Example IX was evaluated for combustion efficiency as follows:

A simulated diesel exhaust gas, containing 0.05% $C_2H_4$, 0.05% $C_3H_8$, 0.10% CO, 3.0% $O_2$, 12.0% $CO_2$, 12.4% $H_2O$ vapor, and the balance $N_2$ was permitted to flow through the catalyst cylinder (the direction of the gas flow being parallel to the passageways) at various temperatures. The Pd cylinder was supported by a ceramic tube and stainless steel screen packed with quartz wool. The reactor pressure was essentially atmospheric (0–2 p.s.i.g.). The space velocity was 40,200 s.c.f./hr./cu. ft. Temperatures were recorded upstream of the catalyst and in the catalyst bed. At various temperatures, samples of gas collected after removal of $H_2O$ vapor and $CO_2$ were analyzed for CO, $C_2H_4$ and $C_3H_8$ using an Infrared Spectrophotometer. The amount of such gases removed from the stream at the recorded temperatures was calculated. A summary of the test results is given in Table II.

TABLE II

| Infrared analyses of gas downstream of catalyst, $H_2O$ and $CO_2$ removed, Percent | | | Temperature, ° C. | | Percent removal | | |
|---|---|---|---|---|---|---|---|
| $C_2H_4$ | $C_3H_8$ | CO | Upstream of catalyst | In catalyst bed | $C_2H_4$ | $C_3H_8$ | CO |
| 0.0 | 0.0 | 0.0 | 552 | 551 | 100 | 100 | 100 |
| 0.0 | 0.0 | 0.0 | 439 | 455 | 100 | 100 | 100 |
| .009 | .059 | 0.0 | 351 | 350 | 86.75 | 13.24 | 100 |
| .039 | .068 | 0.0 | 282 | 282 | 42.7 | 0 | 100 |
| .058 | .068 | 0.0 | 230 | 230 | 14.7 | 0 | 100 |
| .062 | .068 | 0.0 | 178 | 183 | 8.83 | 0 | 100 |
| .068 | .068 | .120 | 123 | 125 | 0 | 0 | 0 |

The data of Table II demonstrate that the catalyst effected 100% burning of the CO and hydrocarbons at temperatures of 455° C. or higher. At a temperature as low as 183° C., 100% of the CO was removed from the stream.

EXAMPLE XI

To the corrugated-type alpha-alumina block of Example I, 26.2 g. of alumina carrier was applied, using a similar procedure to that used in Example I. Such block was cut in half to give 2 blocks, approximately 4" by 3" with 3" length passages, each having about 13 g. of alumina deposited thereon. One of these blocks was treated with tetraamineplatinum (II) hydroxide.

40 ml. of aqueous tetraamineplatinum (II) hydroxide, containing 37.2 g. of Pt per liter of solution (equivalent to 1.5 g. Pt) was diluted with 70 ml. of deionized water. The solution was sprayed into the passages of the indicated corrugated block, first spraying from one side of the block with half the solution and then spraying from the other side of the block with the other half of the solution to effect uniform distribution of the Pt. Any solution which drained from the block was recovered and reapplied. After all of the 110 ml. were deposited on the block, it was dried thoroughly at 110° C. and then heated at 400° C. for one hour. The block was then cooled, sprayed in the same manner with an additional 110 ml. of tetraamineplatinum (II) hydroxide (containing about 1.5 g. of Pt), dried thoroughly at 110° C. and heated at 400° C. for one hour, and finally cooled. A total of about 3 g. Pt were deposited on the block which had been lined with 13 g. of alumina.

EXAMPLE XII

Hydrated alumina analyzing 2% amorphous hydrous alumina, 18% boehmite, 44% bayerite, 28% nordstrandite and 8% gibbsite, was drum dried and calcined at 340° C. for six hours to yield a composition of 86% gamma alumina and 14% boehmite. Two pounds of such drum dried alumina was added to a pellet mill with 910 mls. of deionized water and 20 ml. of concentrated HCl. The mixture was milled for approximately 18 hours at about 80 to 112 r.p.m. to obtain a thixotropic slip. To 1500 grams of the thixotropic slip were added 63.7 grams of a 40% Pt concentrate of chloroplantinic acid dissolved in 33.0 ml. of deionized water and an additional 26.0 ml. of deionized water to yield a slip having a solids content containing 5% Pt and 95% alumina. The solids were calculated to be 31.4% of the slip.

An alpha-alumina corrugated-type block as defined above and approximately 6" by 4" by 3" passage length and having seven corrugations/linear inch throughout the face of the 6" length side, weighed 865 grams. The block was made from essentially crystalline alpha-alumina having typically a surface area (total) of 0.6 m.$^2$/g., a porosity of 0.20 cc./g. and a macropore distribution such that 5% of the pore volume is in pores of over 20,000 A. and less than 2% of the pore volume is in pores of less than 2,000 A. The block was sumberged in deionized water for one hour to fill the pores of the block with water. The block was then drained, blown through, using a high pressure air gun, for about one-half to one minute. The blown block was then weighed to determine the "water-pore volume" and was found to weigh 1,028 grams, giving the block a pore volume of approximately 163 ml. The corrugated block was then immersed in the platinum-containing alumina slip previously prepared for about one minute, while agitating the block and slip so that the slip tended to coat the entire surface of the block and its through corrugations. After shaking and gentle blowing to remove excess slip and ensure free passages, the block was weighed and found to have gained 152 grams in weight.

It was treated with H$^2$S for about 15 minutes, then dried in a forced-air oven at 110° C. and weighed, while warm, 934 grams. After heating the block for one hour to reach 500° C. and maintaining the block at 500° C. for one hour, it was cooled in a desiccator, and then weighed. It was determined that the block had a total net gain of 60 grams. After further treatment with a stream of air blown through the passages, the block was found to have a total net gain of 66 grams. Based on these findings and the composition of the slip containing 5% Pt, it was determined that about 3 g. of Pt and 63 g. of gamma alumina were deposited on the alpha-alumina block. Finally, the block was washed thoroughly with deionized water and then dried in a forced-air oven.

EXAMPLE VIII

A 10% alumina slurry was made of 7.90 kg. of hydrous alumina filter cake (containing 2,156 kg. alumina) and 13.3 liters of deionized water. X-ray diffraction analysis of the slurry, dried at 110° C. showed 1% amorphous hydrous alumina, 19% boehmite, 40% bayerite, 33% nordstrandite and 7% gibbsite (80% trihydrates).

A 10% aqueous solution of H$_2$PtCl$_6$ was then prepared using 284 grams of a 40% Pt concentrate of H$_2$PtCl$_6$ (equivalent to 113.5 grams Pt) and 850 mls. of deionized water. The H$_2$PtCl$_6$ solution was added slowly to the slurry, using a dropping funnel. The mixture was stirred for 15 minutes and the pH was found to be 2.1. After stirring for an additional 10 minutes, 52.2 liters of H$_2$S were run into the mixture at a rate of 1,740 ml. per minute. Following the addition of H$_2$S, the mixture was stirred one-half hour and the pH was found to be 1.1. The mixture was then stirred for an additional one and one-half hours and finally drum dried and calcined for six hours at 340° C. The resultant product, on X-ray diffraction analysis, showed 85% gamma alumina, 15% boehmite and no trihydrates.

A thixotropic slip of the calcined platinum-impregnated alumina was prepared using a similar method of that described in Example XII, but no HCl was used. Analysis of the slip showed 43.4% solids at 1100° C. X-ray diffraction analysis of a sample dried at 110° C. showed 85% gamma alumina, 15% boehmite and no trihydrates.

A water-soaked alpha-alumina block of Example XXII was immersed in the prepared slip in accordance with the procedure described in Example XII. Following the immersion procedure, the block plus slip was dried in a forced-air oven at 110° C., calcined at 500° C., washed thoroughly with deionized water, and finally dried at 110° C., in a forced-air oven. The catalyst block was calculated to have about 2 g. platinum and 45 g. of gamma alumina deposited thereon.

EXAMPLE XIV

One ounce of Pd black was dissolved in 76 ml. of conc. HNO$_3$. The Pd (NO$_3$)$_2$ thus formed was added dropwise to a solution containing 41.72 g. of Na$_2$Cr$_2$O$_7$ dissolved in 150 ml. H$_2$O, and 153 ml. of conc. NH$_4$OH. The resultant residue was filtered and washed. The filtrate had a pH of 6.8–7.0.

After being dried at 100–110° C. 10 g. of the Pd containing residue was milled with 10 g. of drum dried alumina, 50 ml. H$_2$O and 2 drops of conc. HCl. The alumina was the same 340° C. calcined alumina as that described in Example XII above.

A water-moistened alpha-alumina cylinder approximately 1" diameter and 2" length was immersed in the slip milled from the Pd-containing residue and alumina. The cylinder with Pd, Cr and alumina deposited thereon was heated to 360° C. and maintained at 360° C. for 1 hour. About 0.11 g. Pd and 0.16 g. gamma Al$_2$O$_3$ were deposited on the alpha-alumina cylinder.

Although the catalyst of the present invention finds particular utility in auto exhaust purification, its use is not limited thereto. It also finds utility in a variety of catalytic processes where a rugged catalyst of high surface area is desired, particularly gas phase processes occurring favorably at very high space velocity.

It is claimed:
1. A catalyst composition comprising an inert, substantially catalytically inactive refractory support having a film of catalytically active alumina, said film having a total surface area of at least about 25 square meters per gram of said alumina film and containing a small amount of a platinum group metal catalyst, said support being a solid, unitary body having a major proportion of crystalline material and having unobstructed openings therethrough, a total surface area of at least about 0.08 square meters per gram of said support, an accessible pore volume of at least about 0.03 cubic centimeter per gram of support, and a water pore volume of at least about 10%, said film being deposited on said support by contact of the latter with an aqueous dispersion of alumina and calcining the composite.

2. The catalyst composition of claim 1 wherein the platinum group metal is platinum.

3. The catalyst composition of claim 1 wherein the platinum group metal is palladium.

4. The catalyst composition of claim 1 wherein the catalytically active alumina is derived by calcination of alumina hydrate predominating in trihydrate, and said film has a thickness of about 0.0001 to 0.005 inch.

5. The catalyst composition of claim 1 wherein the support has an accessible pore volume of 0.1 to 0.3 cubic centimeters per gram.

6. The catalyst composition of claim 1 wherein the support contains about 3 to 18 cellular channels per inch passing from one surface to the other surface, the cellular channels being defined by an inert refractory wall of about 2 to 25 mils in thickness.

7. The catalyst composition of claim 1 wherein the inert refractory support is alpha-alumina.

8. The catalyst composition of claim 1 wherein the inert refractory support is mullite.

9. The catalyst composition of claim 8 wherein the inert refractory support is zicron-mullite.

10. The composition of claim 1 wherein the water pore volume of the support is about 15 to 50%.

11. The composition of claim 10 wherein the platinum group metal is platinum or palladium.

12. The catalyst composition of claim 11 wherein the inert refractory support is zircon-mullite.

13. A catalyst composition comprising an inert, substantially catalytically inactive refractory support having a film of catalytically active alumina, said film having a total surface area of at least about 25 square meters per gram of said alumina film and containing a small amount of a platinum group metal catalyst, said support being a solid, unitary body having a major proportion of crystalline material and having unobstructed openings therethrough, a total surface area of at least about 0.08 square meters per gram of said support, an accessible pore volume of at least about 0.03 cubic centimeter per gram of support and a macropore distribution such that over 95% of the pore volume is in pores having a diameter of over 2,000 A. and over 5% of the pore volume is in pores having a diameter of over 20,000 A. said film being deposited on said support by contact of the latter with an aqueous dispersion of alumina and calcining the composite.

14. The catalyst composition of claim 13 wherein the platinum group metal is platinum.

15. The catalyst composition of claim 14 wherein the inert refractory support is zircon-mullite.

References Cited

UNITED STATES PATENTS

| | | | |
|---|---|---|---|
| 3,189,563 | 6/1965 | Havel | 252—477 |
| 1,577,188 | 3/1926 | Patrick | 252—460 |
| 2,742,437 | 4/1956 | Houdry | 252—477 |
| 2,964,480 | 12/1960 | Schwartz | 252—439 |
| 3,088,271 | 5/1963 | Smith | 252—477 |
| 3,109,715 | 11/1963 | Johnson et al. | 23—2 |
| 3,167,499 | 1/1965 | Haresnape | 252—477 |
| 3,231,520 | 1/1966 | Leak et al. | 23—2 |
| 3,264,228 | 7/1966 | Burbidge | 23—2 |

DANIEL E. WYMAN, Primary Examiner

P. E. KONOPKA, Assistant Examiner

U.S. Cl. X.R.

23—2.2, 288.3; 117—160, 169; 252—439, 460, 461, 473, 477